United States Patent [19]

Johnson et al.

[11] 3,915,449

[45] Oct. 28, 1975

[54] SHIFTABLE PINCH ROLL FOR MAGNETIC CARD TRANSPORT SYSTEM

[75] Inventors: Robert A. Johnson, Plano, Tex.; Richard G. Ramsdell, Las Gatos, Calif.

[73] Assignee: Xerox Corporation, Stamford, Conn.

[22] Filed: Nov. 11, 1974

[21] Appl. No.: 522,662

[52] U.S. Cl. .................... 271/251; 271/3; 271/274; 226/180; 226/187; 226/198

[51] Int. Cl.²...................... B65H 9/16; B65H 23/28

[58] Field of Search .......... 271/DIG. 9, 3, 248, 249, 271/250, 251, 226, 272, 273, 274; 226/180, 187, 198

[56] References Cited

UNITED STATES PATENTS

| | | | |
|---|---|---|---|
| 642,141 | 1/1900 | Lyon | 226/180 |
| 3,494,525 | 2/1970 | Wiig | 271/251 |
| 3,666,262 | 5/1972 | Fowler et al. | 271/3 |

*Primary Examiner*—Evon C. Blunk
*Assistant Examiner*—Robert Saifer

[57] ABSTRACT

A magnetic card transport subsystem for an electronic typewriter comprises a reversible drive roll and a coacting pinch roll which form a nip through which a magnetic card is passed. The drive roll and pinch roll coact to move the card in opposite directions. The pinch roll is shifted to a particular position when the magnetic card is moved in one direction and then to another position when the magnetic card is moved in the opposite direction in order that the resulting force vector exerted on the card by the pinch roll and drive roll will always be toward a card guide surface. This allows the same pinch roll and drive roll to alternately move the magnetic card in opposite directions while maintaining the card in registered alignment during such movement.

5 Claims, 4 Drawing Figures

SHIFTABLE PINCH ROLL FOR MAGNETIC CARD TRANSPORT SYSTEM

DESCRIPTION OF THE INVENTION

This invention concerns a magnetic card transport subsystem for an electronic typewriter.

It is an object of this invention to provide a simple and efficient card transport system. It is proposed to achieve this object by providing a drive roll and pinch roll which coact to alternately drive a magnetic card in a forward direction past a magnetic head for a read or write function and then in the opposite return direction while the magnetic head changes tracks to perform the read or write function when the magnetic card makes its next forward pass.

It is a further object of this invention to provide a pinch roll which can be shifted to a particular position when the magnetic card is moved in one direction and then to another position when the magnetic card is moved in the opposite direction in order that the resulting force vector exerted on the card by the pinch roll and drive roll will always be toward a card guide surface which allows the same pinch roll and drive roll to alternately move the magnetic card in opposite directions while maintaining the card in registered alignment during such movement.

Other objects of this invention will become apparent from the following description with reference to the drawings.

Figure 1:
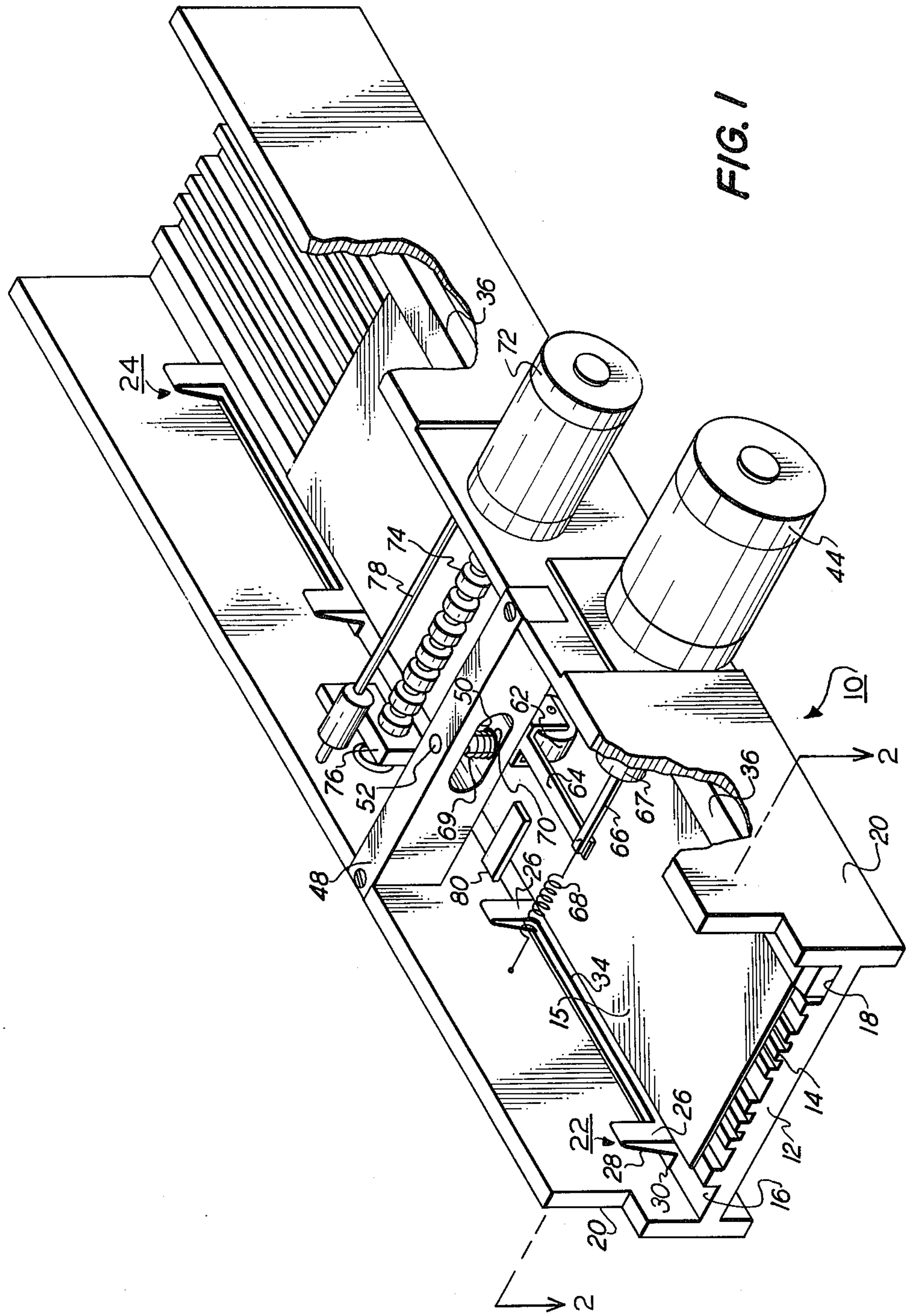
FIG. 1 is a perspective view of a card transport system.
Figure 2:
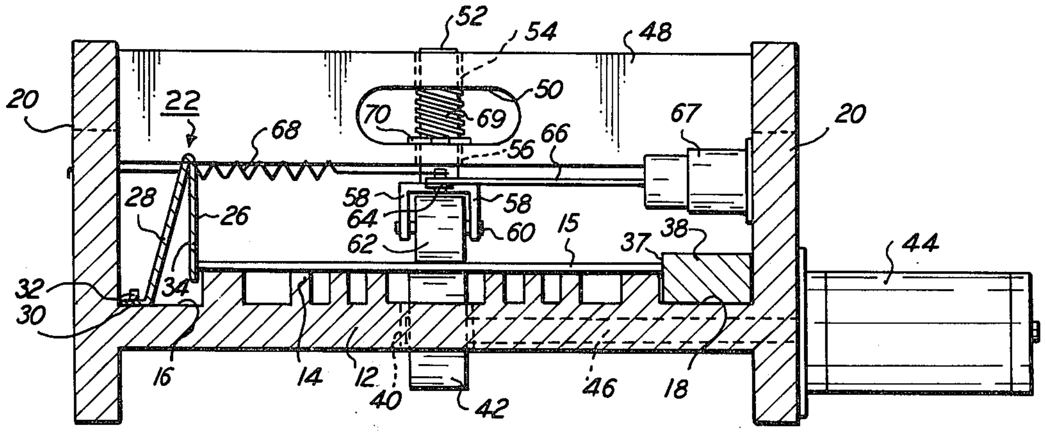
FIG. 2 is a view taken along section line 2—2 of FIG. 1.

Referring to FIG. 1, there is illustrated a card transport subsystem of an electronic typewriter system which comprises a frame 10. The frame 10 comprises a card support platform 12 having a plurality of ribs 14 for supporting a magnetic card 15. One longitudinal edge of the platform is defined by a groove 16 and the other longitudinal edge of the platform is defined by a groove 18. Projecting above the platform 12 adjacent the grooves 16 and 18 are support walls 20. Positioned in the groove 16 are a pair of resilient leaf springs 22 and 24 each of which has two U-shaped sections 26 and 28 connected to each other at the free ends of the legs of the U. The closed end 30 of section 28 is flat and is located in the groove 16 and is secured by screws 32 to the platform 12. The closed end 34 of section 26 is flat and lies in a plane which is approximately normal to the platform with the bottom edge thereof extending below the ribs 14 into the groove 16. The spring is so constructed that section 26 is biased away from section 28.

A guide bar 36 is located in the groove 18 and secured to the platform 12. The guide bar extends substantially above the ribs 14 to provide a guide surface 37 thereabove for a longitudinal edge of the card 15. An opening 40 is provided in the platform 12 and receives a portion of a resilient drive roll 42 therein which is so located that a plane tangential to the periphery of the roller portion extending through the opening 40 will be substantially coincident with the plane of the top of the ribs 14 to prevent possible deformation of or lifting of the card 15 when the card is driven by the drive roll 42. A D.C. motor 44 is secured to one wall 20 and has a drive shaft 46 operably connected to the drive roll 42 by any well-known means to alternately drive the roll 42 in opposite directions.

A support bracket 48 is attached to the walls 20 and has a large central opening 50 therein. A shaft 52 extends through spaced bores 54 and 56 and terminates at the lower end thereof in a pair of spaced legs 58 receiving an axle 60 therebetween about which a pinch roll 62 rotates. An arm 64 extends from the bottom of the shaft and is connected to a plunger 66 of a solenoid 67 which is connected to one of the walls 20. A coil spring 68 is attached at one end to the other of the walls 20 and is attached at the other end to the arm 64. The coil spring is in tension urging the arm toward the same and thereby applying a clockwise rotational force to the shaft 52. Actuation of the solenoid 67 urges the arm 64 towards the same against the force of the spring 68 thereby applying a counter-clockwise rotational force to the shaft 52.

A coil spring 69 surrounds the shaft 52 and has one end engaging the surface or shoulder of bracket 48 surrounding bore 54 and the other end engaging a snap ring 70 secured in an annular groove in the shaft 52. The spring 69 is in compression and biases the shaft 52 downwards until the snap ring 70 engages the bracket surface or shoulder surrounding bore 56. The bracket 48 is secured to the walls 20 in such a manner that the pinch roll 62 will be spaced from the drive roll 42 by less than the thickness of the card 15. For instance, the spacing may be on the order of 0.003 inch while the thickness of the card is 0.008 inch. This is to prevent contact between the two rolls when the machine is not in use to avoid producing depressions in the resilient drive roll 42 since any depression in the drive roll will cause a jerky motion affecting reading the card or writing on the card or subsequent correlation of the two functions. When a card is inserted into the nip between the pinch roll 62 and drive roll 42, the pinch roll 62 is moved vertically relative to the bracket 48 against the force of the spring 69 to accommodate the thickness of the card. The spring 69 maintains sufficient pressure on the card 15 to effect a sufficient friction driving force between the card and drive roll 42.

A step motor 72 is connected to one of the walls 20 and a worm gear 74 extends therefrom across the platform and is journalled into the other wall. A magnetic head 76 is operatively secured to a guide rod 78 and to the worm gear 74 for stepped slidable movement across the platform 12. A light emitting diode (LED) detector 80 is located to detect the leading edge of the card which then actuates a control circuit. The control circuit is designed to place the magnetic head 76 and the motor 44 into a read or write condition depending on the function selected by an operator. In the write condition, an operator types one line of information into a buffer system to store the information. When the operator hits the carriage return button, the motor 44 is actuated to rotate the drive roll 42 to drive the card 15 forwards and simultaneously bits of information are fed from the buffer to the magnetic head 76 and recorded on the card. After one line of information is recorded, the motor 44 is reversed to reverse rotation of the drive roll 42 and thereby move the card in the reverse direction while simultaneously motor 72 is actuated to move the magnetic head 76 transversely to the next track. The same procedure is followed after the operator types the next line and pushes the carriage return button. In the read condition, the motor 44 is continuously actuated to alternately move the card 15 in opposite directions. The magnetic head reads a track of bits during forward movement of the card 15 therepast and the card 15 is moved in the reverse direction while the magnetic head is moved transversely to the next track by motor 72. A sheet of paper is typed automatically in accordance with the bits of information on the card 15 during reading thereof. A sensing means such as a diode is located to sense the polarity of current passing to the motor 44 and, depending upon the polarity, will either block the flow of current to the solenoid 67 or pass adequate current thereto to actuate the same. For instance, when the motor 44 is rotating the roll 42 to drive the card forwards, the diode will prevent current from passing to the solenoid. When the motor 44 is rotating the roll 42 to drive the card in the reverse direction, the diode will pass current to the solenoid to actuate the same. The diode prevents current from passing to the solenoid when the motor 44 is cut off.

Figure 3:
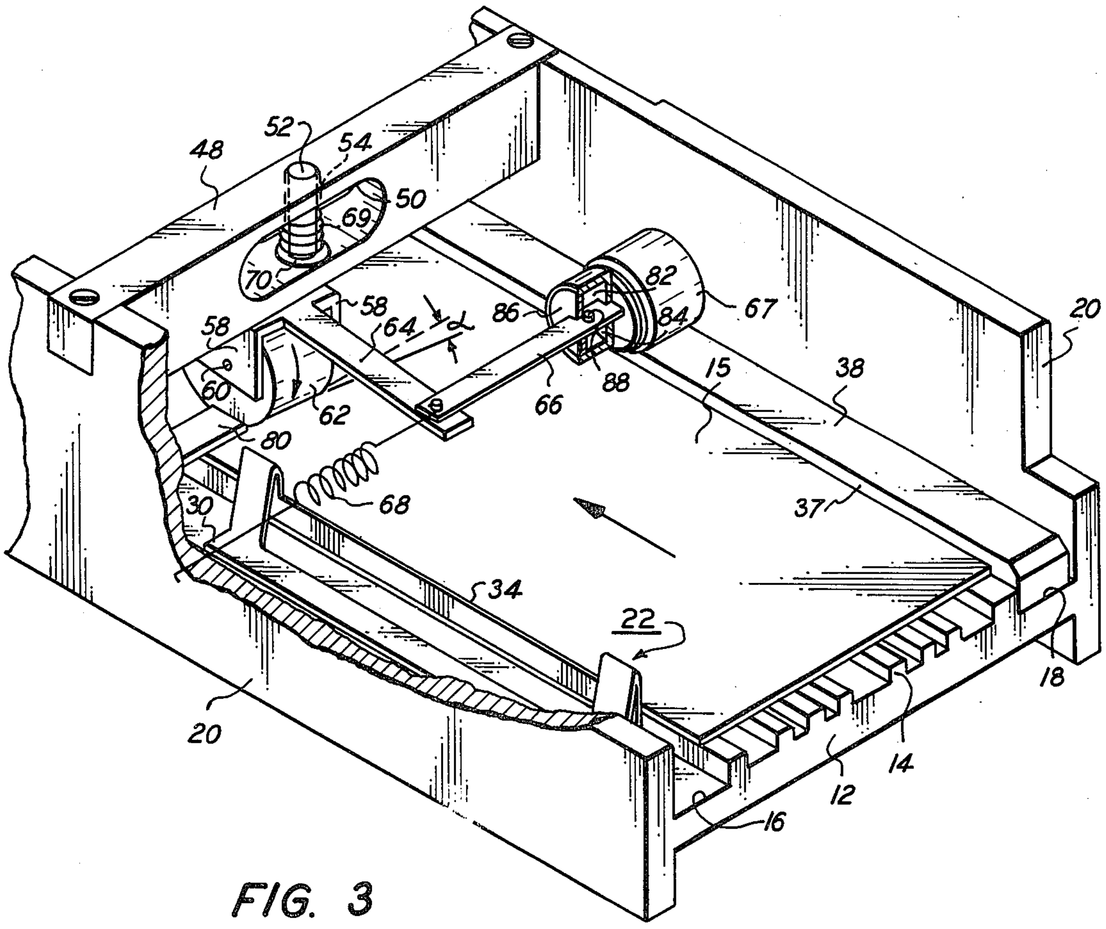
FIG. 3 is a perspective view of a position of the card transport system illustrating a position of a pinch roll during a card reading or writing function of the system.
Figure 4:
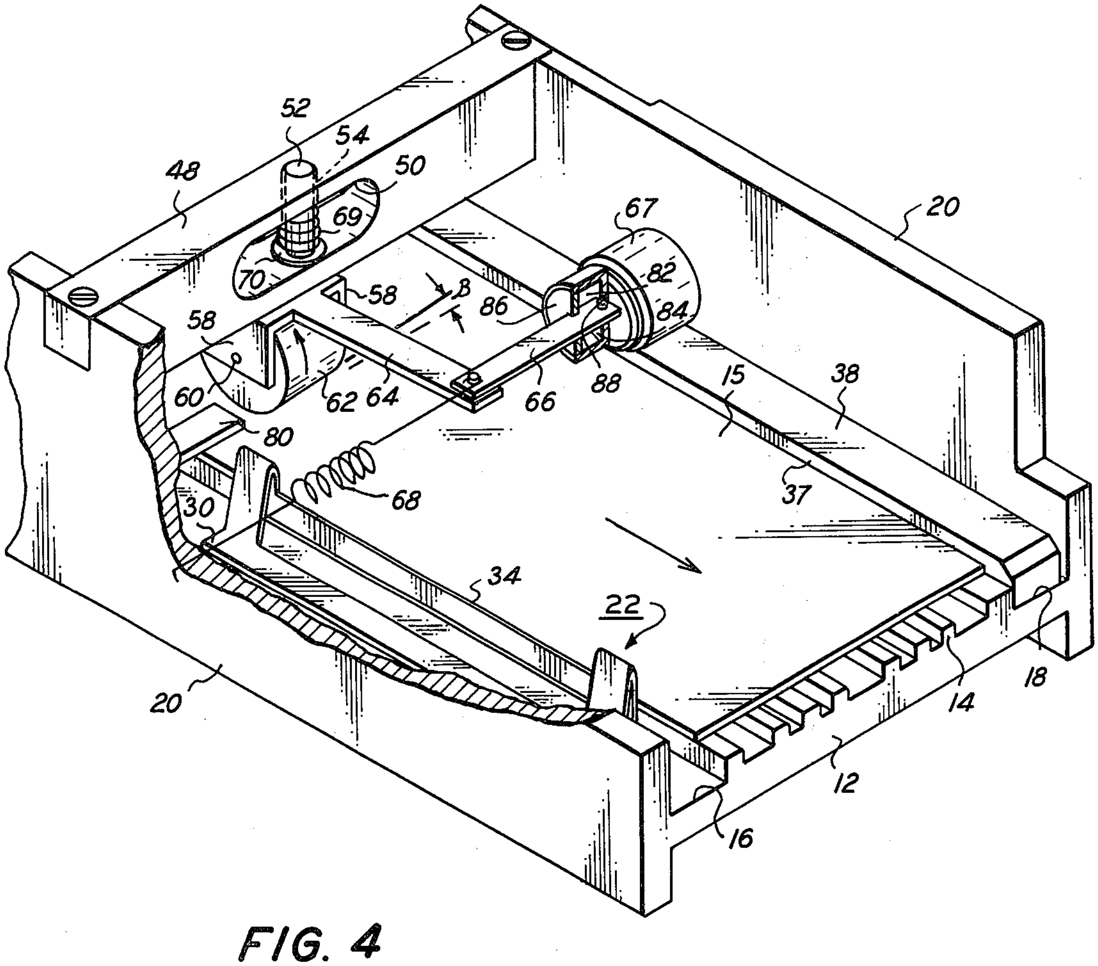
FIG. 4 is the same perspective view as FIG. 3 only illustrating a position of the pinch roll during a card return function of the system.

A chamber 82 is at the front end of the solenoid. The end walls 84 and 86 of the chamber act as limit stops for the plunger 66 which has a pin 88 protruding therefrom in the chamber 82. The pin 88 engages the wall 84 to limit movement of the plunger when the solenoid is actuated to thereby limit counter-clockwise rotation of the shaft 52 and the pin 88 engages the wall 86 to limit movement of the plunger under the force of spring 68 to thereby limit clockwise rotation of the shaft 52. The walls 84 and 86 are so located that when the pin 88 engages walls 84 and 86, the axis 60 of the pinch roll will be at an angle $\alpha$ (FIG. 3) and angle $\beta$ (FIG. 4), respectively, with a line perpendicular to the guide surface 37 which positions the pinch roll 62 to coact with the drive roll 42 so that the resultant force vector exerted thereby on the card will always be at a slight angle with and toward the guide surface. Normally, such angles will be between ½° and 10°. Angles larger than 10 ° cause too much friction between the card and the guide surface.

The significance of changing the positions of the pinch roll 62 can be seen when comparing the same to a fixed pinch roll which is in a position out of line with the guide rail by a slight rotation in a counter-clockwise direction as, for instance, the angle $\beta$. During forward movement of the card, the driving force vector between the drive roll and pinch roll will drive the card in a skewed direction away from the guide rail 36 toward the spring 24. When the card moves in the reverse direction, the force vector between the pinch roll and drive roll is toward the guide rail which does not cause the above problem. If the fixed pinch roll is in a position out of line with the guide rail by a slight rotation in a clockwise direction as, for instance, the angle $\alpha$, then the same problem occurs in the card reverse movement rather than in the card forward movement. Thus, with a roller fixed against free angular alignment, manufacturing tolerances must be very tight or the above problem will occur when the same drive roll and pinch roll are used for moving a card in reverse directions. These tight tolerances may in some instances be impractical to hold. One obvious alternative method to overcome the above problem would be to design the spring 24 to have a force to overcome the continuous frictional contact between the card and pinch roll 62 to continuously keep the card against the guide rail. However, this will create a higher frictional contact against the guide rail increasing the resistance to forward movement of the card. To overcome this resistance, a stronger motor is needed to drive roller 42 which increases the skew driving force. Thus, this becomes quite a design problem which is eliminated by rotating the pinch roll about a vertical axis to different positions for forward card movement and reverse card movement.

In operation, the card 15 is placed onto the platform 12. As the leading edge thereof slides past the LED 80, the control circuits are readied for activation and further movement of the card brings the leading edge thereof to the nip between the rolls 42 and 62 raising the pinch roll 62 against the spring 69 to accommodate the thickness of the card. When the motor 44 is activated either by a depressing a carriage return button or by depressing the appropriate button for reading the card, the drive roll 42 is rotated in a counter-clockwise direction (using FIG. 3 for orientation) to drive the card forwards. The side edge of the card engages leaf spring 22 which exerts a force on the card to urge the opposite edge thereof against the guide surface 37 to maintain registration for reading and writing functions. The arm 64 is under the force of spring 68 which maintains the axis of the pinch roll (FIG. 3) at an angle $\alpha$ with a line perpendicular to the guide surface 37. Therefore, the resultant vector of the force exerted on the card by the pinch roll and the drive roll 42 is toward the guide surface 37 which helps to maintain the card against the guide surface. As the card continues its forward movement, it moves under the magnetic head for either the recording or reading function and engages the spring 24 which in conjunction with spring 22 urges the card toward the guide surface 37. After the card has moved forward to receive a certain quantity of data bits from the magnetic head or a certain quantity of data bits have been read by the magnetic head, the control circuit will act to reverse the motor 44 to reverse the rotation of the drive wheel 42 and thereby move the card rearwards to its next read or write position. When motor 44 is reversed, the solenoid 67 is energized. When the solenoid is energized, the shaft 52 and thereby the pinch roll is rotated to the position (FIG. 4) which has its axis at an angle $\beta$ with a line perpendicular to the guide surface 37. Therefore, the resultant vector of the force exerted on the card by the pinch roll 62 and drive roll 42 is toward the guide surface 37 which helps to maintain the card against the guide surface. At the same time, step motor 72 is activated to transversely move the magnetic head 76 to the next track.

What is claimed is:

1. A card transport system comprising a card support member having a top surface, stationary guide means extending along one longitudinal edge of said support member and extending above said top surface, an opening in said member extending through said top surface, a drive roll supported for rotation about an axis which is generally parallel to said top surface and having a portion thereof extending into said opening with a plane tangent to the periphery thereof being substantially coplaner with said top surface, means for driving said roll in opposite directions, a rotatable shaft extending in a direction generally normal to said top surface, a pinch roll operably connected to said shaft for rotation about an axis generally normal to said shaft, said pinch roll being located above said top surface opposite said drive roll and forming a card receiving nip with said drive roll, resilient means urging said pinch roll towards said drive roll, and means for rotating said shaft to locate the axis of said pinch roll at a first position which is at a slight angle to a line perpendicular to said guide means when said drive roll is driven in one direction and for rotating said shaft in the opposite direction to bring the axis of said pinch roll past the line perpendicular to said guide means to a second position at a slight angle to the line perpendicular to said guide means when said drive roll is driven in the opposite direction, said angles being such that the resultant force vector exerted by said nip on said card will always be at a slight angle with and toward said guide means when said drive roll is driven.

2. The structure as recited in claim 1 further comprising means for limiting movement of said pinch roll toward said drive roll so that said pinch roll is slightly spaced from said drive roll.

3. The structure as recited in claim 1 wherein said means for rotating said shaft comprises biasing means operably connected to said shaft to urge said shaft to rotate in one direction and a solenoid operably connected to said shaft to rotate said shaft in the opposite direction against the force of said biasing means upon actuation thereof.

4. The structure as recited in claim 3 further comprising a support bracket, said support bracket including an opening having vertically spaced apart shoulders, said shaft being rotatably mounted on said bracket and extending through said opening past said shoulders, spring support means extending transversely from said shaft, said resilient means urging said pinch roll towards said drive roll comprising a coil spring surrounding said shaft and having one end operatively connected to one of said shoulders and the other end operatively connected to said spring support means on said shaft to bias said shaft in a downward direction.

5. The structure as recited in claim 4 wherein said spring is compressed between the upper one of said shoulders and said spring support means.

* * * * *